Feb. 7, 1939. A. J. A. ASPLUND 2,145,851
APPARATUS FOR MANUFACTURE OF PULP
Original Filed Sept. 19, 1934    8 Sheets-Sheet 6

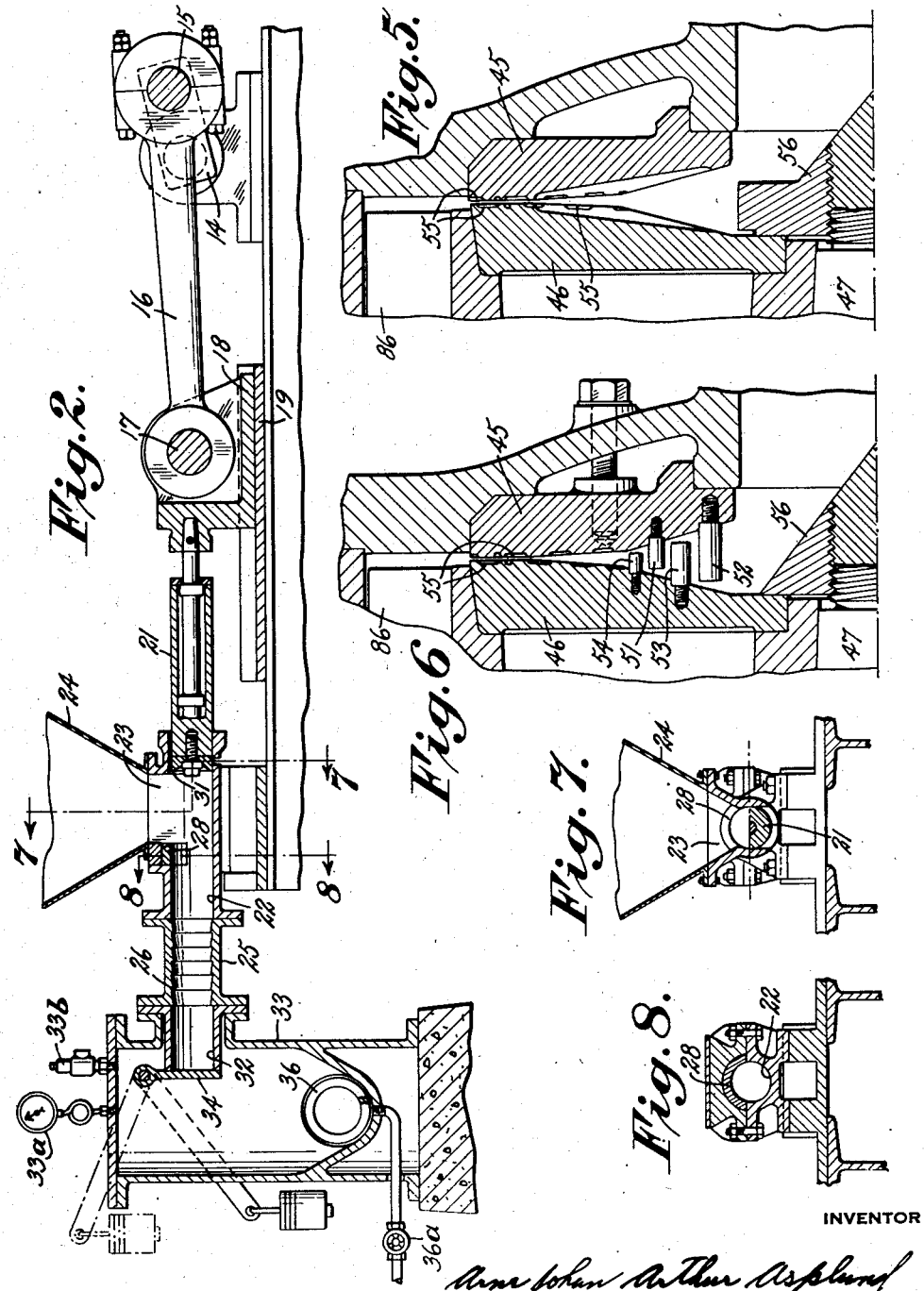

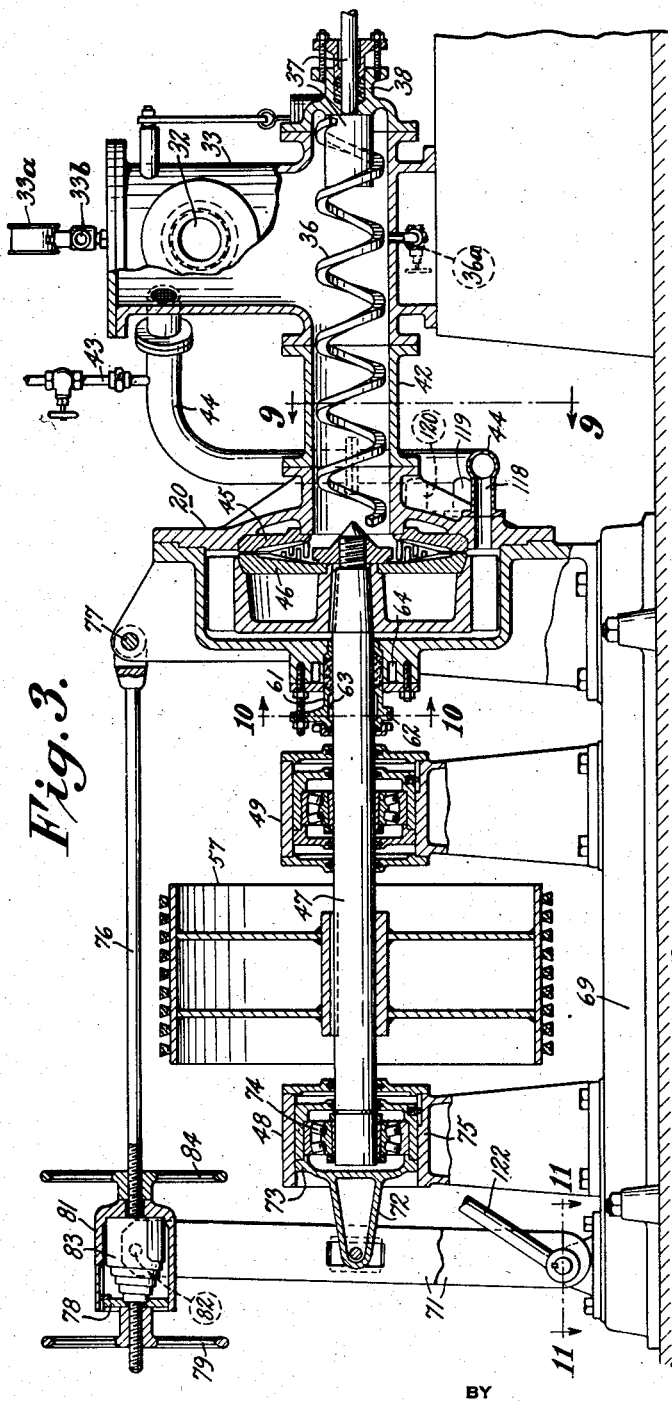

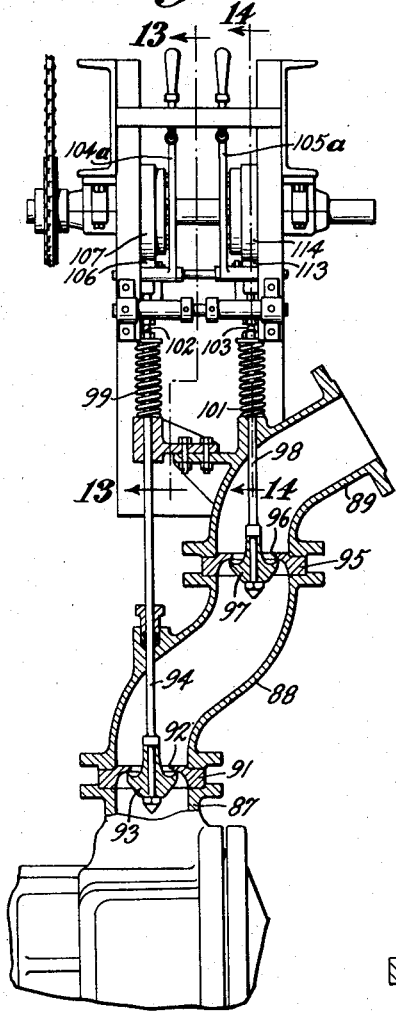
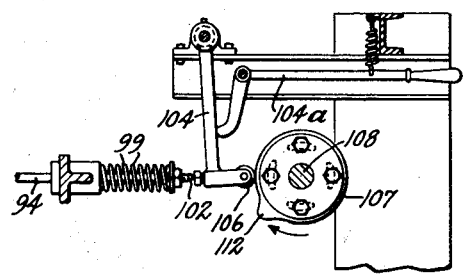
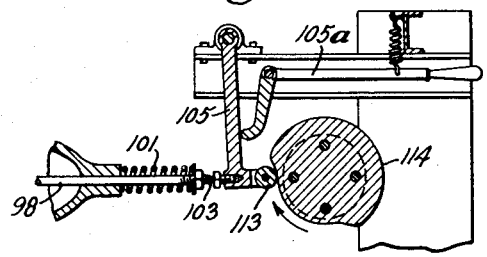
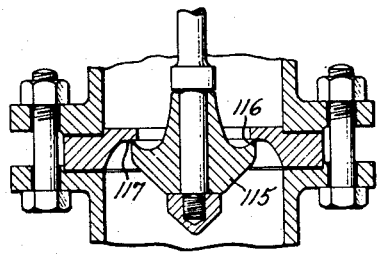

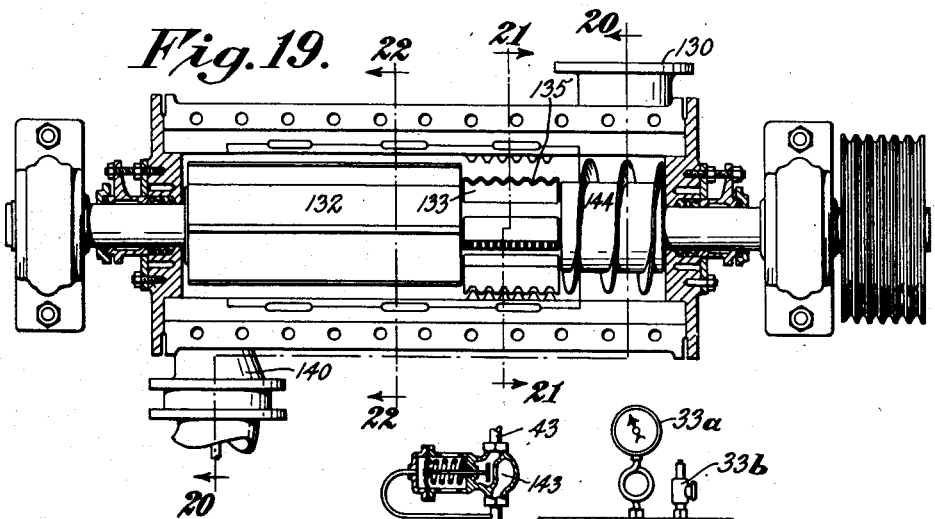
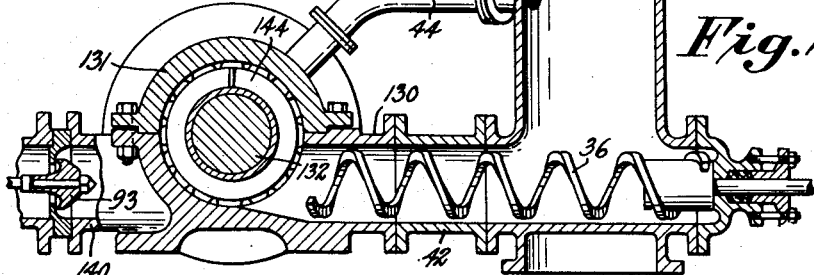
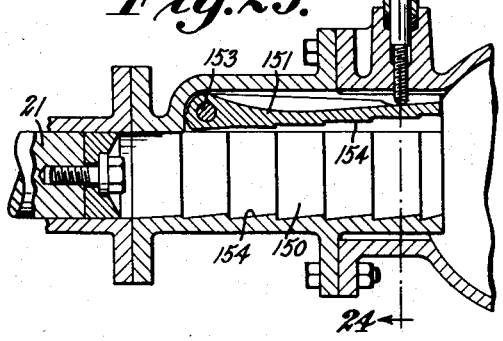
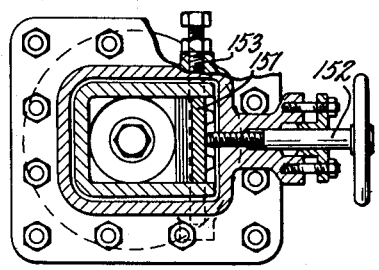

Feb. 7, 1939.   A. J. A. ASPLUND   2,145,851
APPARATUS FOR MANUFACTURE OF PULP
Original Filed Sept. 19, 1934    8 Sheets-Sheet 8

INVENTOR
Arne Johan Arthur Asplund
BY
Wm. T. Hedlund
his ATTORNEY

Patented Feb. 7, 1939

2,145,851

UNITED STATES PATENT OFFICE 2,145,851

APPARATUS FOR MANUFACTURE OF PULP

Arne Johan Arthur Asplund, Stockholm, Sweden, assignor to Aktiebolaget Defibrator, Stockholm, Sweden, a corporation of Sweden Original application September 19, 1934, Serial No. 744,657. Divided and this application September 19, 1934, Serial No. 744,658. In Sweden March 29, 1932

16 Claims. (Cl. 92—6)

This application is a continuation in part of my copending applications Serial No. 611,700, filed May 16, 1932, and Serial No. 712,326, filed February 21, 1934, and is a division of my copending application Serial No. 744,657 filed concurrently herewith which matured into Patent No. 2,008,892, issued July 23rd, 1935.

My invention relates to apparatus for the production of pulp from ligno-cellulose materials, such as wood chips, and more particularly to the production of pulp by what is generally termed a "mechanical" process. The invention has for its object to materially shorten the time required for the manufacture of pulp and to materially decrease the power consumption required while producing a pulp of high quality.

In mechanical processes the defibration is accomplished by grinding, beating, kneading or other frictional action, which actions generally may be termed abrading, with a softening of the lignin by heating.

In accordance with my invention, the material to be heated is subjected to an environment of steam or other gaseous environment, any amount of water present being so small as to be substantially entirely absorbable in the material, the temperature of the environment being above 212° F. and sufficiently high to markedly soften the ligneous substance of the middle lamella, and heated by said environment for a short period of time, usually a matter of seconds, whereupon, while in the same environment and under the same conditions, the material is defibrated.

My invention will be understood by reference to the accompanying drawings, forming a part of this specification and showing various forms of apparatus by means of which the process may be carried out, and of which:

Fig. 2 is a vertical sectional view of part of the plant taken on the line 2—2 of Fig. 1;

Fig. 3 is a vertical sectional view of part of the plant of Fig. 1 taken on the line 3—3 of Fig. 1;

Fig. 5 is a sectional view taken on the line 5—5 of Fig. 4;

Fig. 6 is a sectional view taken on the line 6—6 of Fig. 4;

Fig. 7 is a sectional view taken on the line 7—7 of Fig. 2;

Fig. 8 is a sectional view taken on the line 8—8 of Fig. 2;

Fig. 9 is an elevational view partly in section taken on the line 9—9 of Fig. 3;

Fig. 10 is a sectional view of stuffing box construction taken on the line 10—10 of Fig. 3;

Fig. 11 is a plan view partly in section taken on the line 11—11 of Fig. 3;

Fig. 12 is a horizontal sectional view of the discharge apparatus forming part of the plant shown in Fig. 1;

Fig. 13 is a view of valve actuating mechanism taken on the line 13—13 of Fig. 12;

Fig. 14 is a view of valve actuating mechanism taken on the line 14—14 of Fig. 12;

Fig. 15 is an enlarged view of a valve forming part of the discharge structure;

Fig. 19 is a horizontal longitudinal sectional view through an actual apparatus similar to the apparatus shown in Fig. 17;

Fig. 20 is a vertical sectional view taken on the line 20—20 of Fig. 19;

Fig. 23 is a horizontal sectional view of a modified feeding structure; and

Fig. 24 is a transverse sectional view taken on the line 24—24 of Fig. 23.

Figure 1:
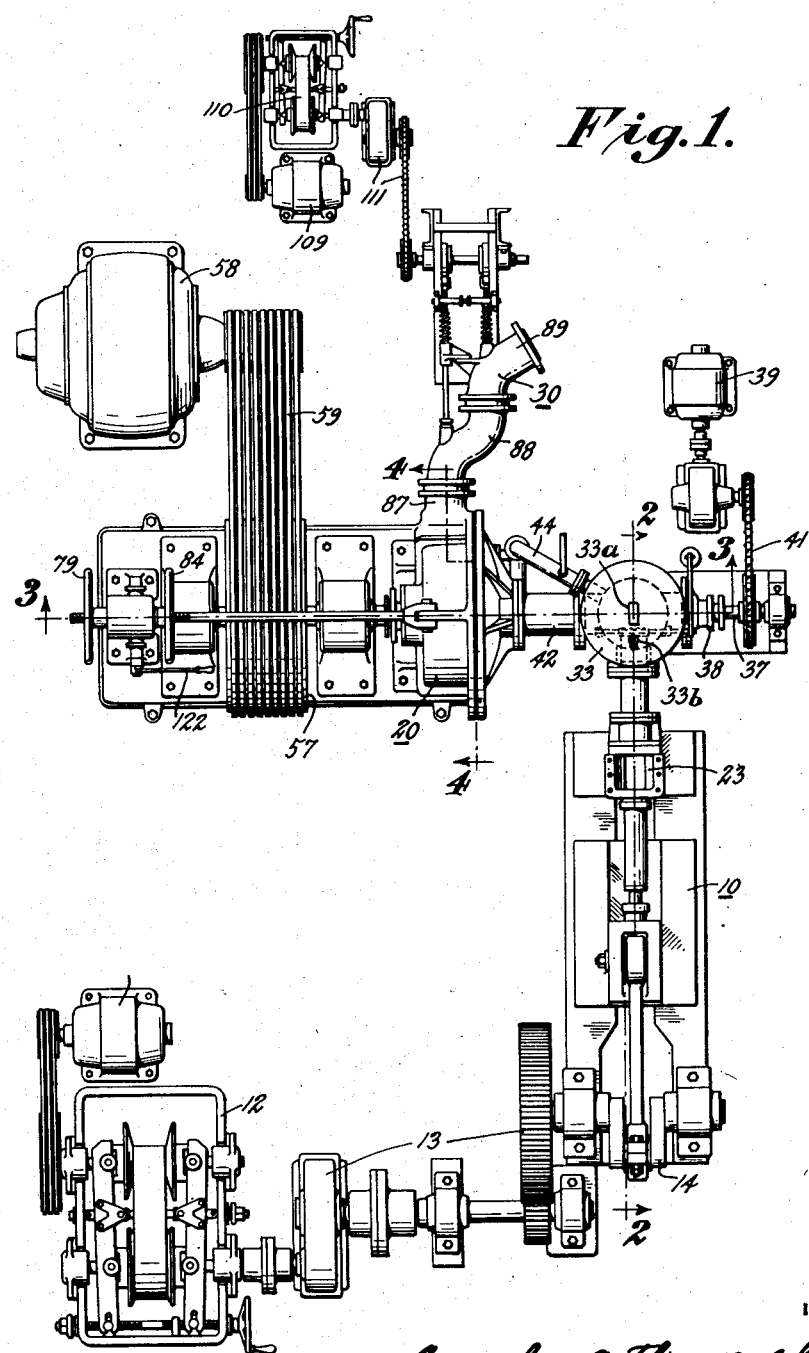
Fig. 1 is a plan view of a plant or apparatus or system for carrying out my invention.

Referring more particularly to Fig. 1, the plant or system includes feeding apparatus designated generally by the numeral 10, mechanical defibrating apparatus designated generally by numeral 20, and discharge apparatus designated generally by numeral 30. A motor 11 drives the feeding apparatus through a regulatable variable speed transmission 12 and reduction gearing 13. The reduction gearing drives a crank 14 (see also Fig. 2) including a crank pin 15 on which is mounted a connecting rod 16 having its other end mounted on a wrist pin 17, in turn mounted on a cross-head 18 mounted to slide in cross-head guide 19. To the cross-head is attached a plunger 21 which due to rotation of the crank, reciprocates within a cylinder 22 which has an opening 23 adapted to receive the material to be made into pulp. The material may, for example, consist of wood chips of the ordinary size used in pulp manufacture, for example, about one inch long.

While the apparatus is adapted to produce pulp from other materials than wood chips, such as straw, bamboo and a variety of other ligno-cellulose materials, it will be assumed for purposes of description of the process that wood chips are being treated. The wood chips may be fed to the cylinder 22 from a hopper 24, or other suitable feeding means. Connected to and communicating with the cylinder 22 is a member 25 having projections 26 on the interior surface thereof in the form of sections of cones. This device 25 serves to hold the material in compressed condition when the plunger 21 is moved backwards, namely, to the right as shown in Fig. 2.

The plunger 21 in the apparatus disclosed has a loose fit in the cylinder 22 to allow any liquid which may be squeezed from the wood chips by the plunger action to leave the apparatus. In accordance with the invention, the wood chips supplied to the apparatus are in what may be termed a dry state. By this of course is not meant bone-dry state but a state involving the absence of free water surrounding the chips. The material fed to the apparatus preferably has a moisture content not exceeding 60 percent by weight and in the case of very wet wood it is desirable to first dry the wood before being supplied to the apparatus. While the presence of moisture is desirable, my process is preferably carried out with a minimum of free water. The feeding apparatus, therefore, acts not alone as a feeder but also as a dryer since if the wood is very wet the moisture will be squeezed out of it by the plunger action and removed at this point so that the material is of substantially the moisture content indicated above when it passes into the steam atmosphere hereinafter to be described.

Adjacent the inlet 23 is a cutter 28 having a cutting edge directed toward the plunger 21. The plunger on its forward stroke passes alongside of this cutting edge. The plunger is formed with a circumferential cutting edge 31 which cooperates with the cutting edge of the cutter 28 to cut the material being fed so that it will not find its way in between the plunger 21 and the wall of the cylinder 22.

In practice the plunger is reciprocated many times a minute, for example, 10 to 50 times per minute.

On the forward stroke of the plunger, the quantity of wood chips in the cylinder 22 is forced forward into the member 25. Compression of this material takes place, and on the return or back stroke of the plunger the material is held in the member 25 due to the conical projections 26. Thus the wood chips form a stopper at the inlet to the path of flow of chips through the high pressure steam space and assist in maintaining the pressure within said space. The material moves through the member 25 and pipe section 32 and enters a receiving vessel 33. The members 22, 25 and 32 constitute a conduit forming a path of flow through which the chips are conveyed by means of the plunger 21, the end surface of which is disposed transversely to the lengthwise direction of the path. When the plunger is reciprocated this surface exerts a force on the dry chips in the lengthwise direction of the path and thus forces the chips to move through the path. A check valve 34 may be provided at the outlet end of pipe member 32 to prevent too violent a back-flow of wood chips toward the supply mechanism in case the friction of the material against the walls of the supply path to receiver 33 is insufficient to hold the chips from flowing backwards with the plunger. This check valve 34 may also serve to deflect the material into the receiver 33. In the bottom of receiver 33 is a screw-conveyer 36. As shown more clearly in Fig. 3, the screw-conveyer is mounted on a driving member 37 passing through a stuffing box 38 and driven by a motor 39 and gearing 41 (Fig. 1). This screw-conveyer may be driven at constant speed. The conveyer extends into a connection 42 forming an outlet for the receiver 33 and leading to the central part of the mechanical defibrating apparatus 20. Connection 42 forms a path of flow which is a continuation of the path formed by members 22, 25 and 32. The forward surface of screw conveyer 36 is inclined with respect to the lengthwise direction of this path and consequently extends transversely thereof. When the conveyer is rotated, this surface exerts a force on the dry chips in a direction having a component in the lengthwise direction of the path, whereby the chips are caused to move through the path formed by connection 42 to the defibrating apparatus 20. In the apparatus shown, this device is of the disc-refining or grinding type and may be termed a grinder although it will be understood that other forms of devices may be used depending upon the quality of the pulp to be produced.

Steam is admitted to the receiver 33 by means of pipes 43 and 44. Mounted on the receiver is a pressure gauge 33a and a safety valve 33b. The bottom of receiver 33 may be provided with a drain connection having a valve 36a therein for draining off free water. Assuming that the wood chips are derived from coniferous woods, the steam supplied, which may be regulated in any desired manner, by a hand valve or automatically, is preferably of such temperature as to provide a temperature of between 300° F. and 340° F. in the apparatus. The chips having been supplied at ordinary temperature will act as a condensing medium for the steam. The steam penetrates the pores of the material and condenses in the interior thereof. As the transfer of heat from the steam to the material is carried out at the temperature of condensation, the rate of heating is rapid and the time required to raise the temperature of the material to the aforesaid temperature is not more than 20 to 40 seconds, depending on the original moisture content and temperature of the wood. Material having an initial content higher than 50 percent and a temperature below the freezing point of water requires a longer time before its temperature is raised to the desired degree.

I have found that this treatment of wood acts to markedly soften or to melt the ligneous substance of the middle lamella of the wood in a manner analogous to the melting or softening of wax. Although it is not known whether or not the substance in the middle lamella really melts at such temperature, the effect on the ligno-cellulose material is such as if melting actually were taking place. Although good results have been obtained with lower temperatures as above indicated, and even down to temperatures not materially above 212° F., depending on the character of the material, the best results are obtained at higher temperatures. The defibration of coniferous woods is preferably carried out at temperatures from 250° F. to 360° F. and, as above indicated, the best results are obtained at temperatures between 300° F. and 340° F. The defibration of hard woods may be accomplished at somewhat lower temperatures, the best results having been obtained between 280° F. and 300° F. Material derived from straw, bamboo or grass may be satisfactorily treated at still lower temperatures. These temperatures, are, however, lower than the temperatures at which the walls of the individual fibers are disintegrated and a distinction should be borne in mind between the ligneous substance of the middle lamella, which I find can be markedly softened or melted by elevation to the temperatures indicated, and the ligneous substance in the fiber walls which withstands higher temperatures before permitting easy destruction of the fibers themselves. To disintegrate the walls of the fibers without applying great mechanical effort, it is necessary to heat the material to considerably higher temperatures, at any rate above approximately 390° F.

The screw-conveyer 36 carries the material into the center of the grinder. It will be understood that the material is conveyed in what may be termed dry state and I prefer not to have any free water anywhere in the path of flow of material. The grinder includes a stationary disc 45 and a rotary disc 46 mounted on a shaft 47 journalled in bearings 48 and 49. The discs 45 and 46 have mounted therein pins 51, 52 and 53, 54, respectively (Fig. 6). The discs are rifled as shown at 55. Rotor 46 is secured to the shaft in any suitable manner as by a nut 56. The shaft is driven at constant speed by a pulley 57 keyed thereto driven in turn from a motor 58 by belting 59.

Shaft 47 passes through a stuffing box 61 which includes a gland 62 provided with a cooling channel 63. Cooling is also provided at 64 in the main housing of the grinder adjacent the stuffing box. Circulation pipes 65 and 66 (Fig. 10) conduct cooling fluid to and from the channel 63 and cooling pipes 67 and 68 conduct cooling fluid to and from the space 64. In addition to cooling, this provides a seal for preventing leakage of steam from the grinder.

Mounted on the base 69, which supports the grinder, is a pair of levers 71. Mounted in central slots of the levers is a member 72 which is connected to a sliding housing 73 of the bearing 48. Within housing 73 is a roller bearing cage and rollers 74 the inner ring of which is secured to shaft 47. The housing for the bearing cage is slidably mounted on the standard 75. A similar slidable construction is employed in the bearing assembly 49 whereby the shaft 47 is adapted to move horizontally so that the discs 45 and 46 may be moved closer to each other or farther away from each other.

A rod 76 is pivotally mounted at 77 on the casing for the grinding discs and carries a disc 78 loosely mounted thereon and adapted to move on the rod by a hand-screw 79. Disc 78 is positioned within and slidable with respect to a housing member 81 which is mounted on the top ends of the levers 71 at 82. A spring 83 acts between the disc 78 and the housing member 81 to press these members apart. The position of the housing member 81 may be limited and adjusted by hand-wheel 84. The purpose of this arrangement is to exert a pressure on the shaft 47 to urge the disc 46 toward the disc 45. This pressure is adjustable by means of the hand-wheels 79 and 84.

Figures 4, 16:
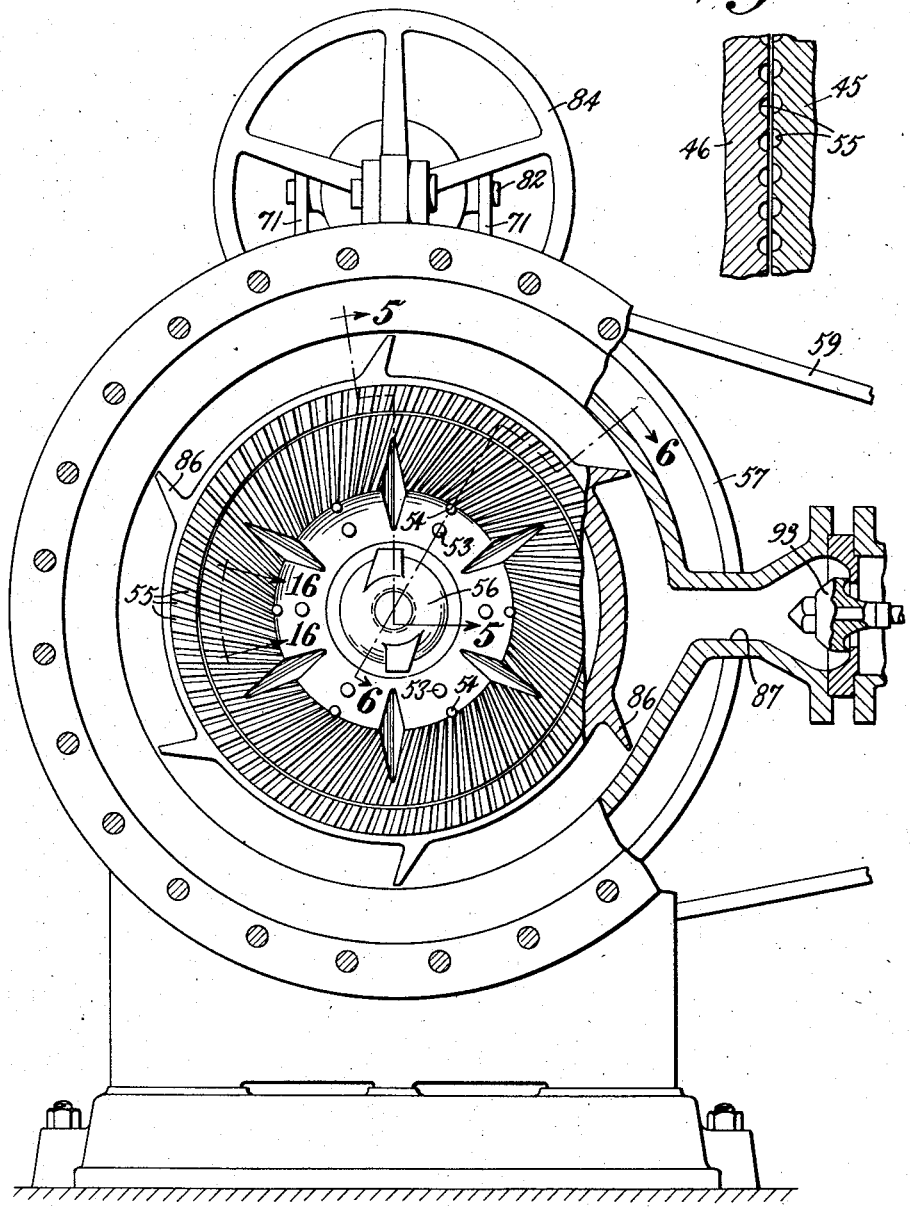
Fig. 4 is a sectional view taken on the line 4—4 of Fig. 1.
Fig. 16 shows a detail in cross-section taken on the line 16—16 of Fig. 4.

The wood chips fed to the grinder pass through the grinder due mainly to centrifugal force and partly due to the forcing of new material into the same space and the action of the screw-conveyer 36. The material passes between the discs and the fibers are separated due to abrasion. Oblique vanes 86 (Fig. 4) urge the material outwardly and into an outlet pipe or connection 87. The outlet 87 leads through a valve port to a pipe section 88 which leads through another valve port to a pipe section 89 from which the material is conveyed to any suitable place of disposition (Fig. 12). Members 87 and 88 are both flanged and between these flanges is a plate 91 having a valve port 92 therein. This port is controlled by a valve member 93 mounted on a valve stem 94. At its other end, pipe member 88 is flanged, and between such flange and a flange on member 89 is a ported member 95, the port 96 of which is controlled by a valve member 97 mounted on a stem 98. Stems 94 and 98 are spring-pressed by means of springs 99 and 101 into closed position and abutments 102 and 103 on the ends thereof respectively abut against valve rockers 104 and 105 respectively (Figs. 13 and 14). Member 104 carries a roller 106 which rolls on the periphery of a cam 107 adjustably mounted on a shaft 108 and driven by a motor 109 through a regulatable variable speed mechanism 110 and reduction gearing 111. The cam 107 includes a projection 112 which moves the roller 106 to the left, as shown in Fig. 13, once for one revolution, to open valve 93 periodically. Mounted on member 105 is a roller 113 which contacts the periphery of a cam 114 also mounted on shaft 108 and driven by motor 109. This cam has an extended projected surface as shown in Fig. 14 whereby valve 97 is opened for a substantial portion of a revolution of member 114. However, it will be seen that the cams are so adjusted and constructed that when the one valve is open the other valve is closed respectively. Levers 104a and 105a are provided for holding the valves open manually. When the cams do not act on the valves, they are closed partly due to spring pressure and partly due to steam-pressure ahead of the valves.

Assuming that valve 93 is opened, material is forced into pipe section 88 to fill the same. Then valve 93 closes and valve 97 opens whereupon the greater part of this material leaves the pipe section 88 due to the lower outside pressure which generally is atmospheric. When the valve 93 is open the pressure of the steam environment in the grinder is imposed upon the interior of pipe 88. As above indicated, this pressure may be 8 atmospheres or approximately 115 pounds per square inch gauge. It is clear, therefore, that when valve 97 is open the moisture in the pulp will to some extent vaporize and together with the steam pressure therein will cause an expansion which will drive out the pulp through the pipe section 89.

Fig. 15 shows the preferred construction of the valves 93 and 97 wherein the seating periphery of the valve member 115 is more or less sharp as at 116 and seats on a flat surface 117. With this construction I have found that leakage is avoided between the valve face and valve seat due to pulp therebetween. The narrow valve face compresses the pulp so that it, in effect, constitutes a packing between the valve face and valve seat. The pulp cushions the impact of the valve member on the seat. In operation, the valves are opened and closed many times a minute, for example, 60 to 100 cycles per minute.

When valve 93 is open it will be appreciated that there is a flow of material and steam into the pipe section 88 which would tend to reduce the pressure in the grinding housing. In order to prevent any drop of pressure due to the opening of valve 93 the pipe 44 is connected at a plurality of points 118, 119 and 120 to the discharge side of the grinding discs. There is thus free access of steam to the discharge side of the grinding discs wherefore the steam pressure is equalized and variation in pressure between these discs is prevented. Without such a by-pass of steam to the outlet side of the grinding discs the reduction in pressure on the discharge side of the rotating disc due to opening of valve 93 would tend to cause the discs to move apart as a result of which material might pass through the grinding discs too quickly. For a uniform quality of product it is desirable that the pressure between the discs be constant.

In order to quickly release the pressure between the discs, the levers 71 are pivoted as shown in Fig. 11 on an eccentrically mounted shaft 120 mounted on pins 121 rotatable in journals fixed to the foundation 69. By turning the lever 122, the lower end of member 71 can be quickly moved to the left as shown in Fig. 3 whereby the discs 45 and 46 can be quickly moved apart when stopping the apparatus or in case of emergency as when a piece of metal might accidentally be carried into the apparatus. Also in starting the apparatus it is desirable to have the discs separated so that they will not wear on each other before the wood chips are present between the discs, wherefore this arrangement can also be used for bringing the discs together when starting operation.

In starting the system, it is desirable to use the following procedure. First, the apparatus is thoroughly heated by steam. The supply can be closed by running the plunger 21 inward in the cylinder 22. The outlet valves are operated at slow speed. At the same time motor 58 is run to rotate disc 46 to throw out condensate through the discharge apparatus. When the apparatus is warm, the steam supply is shut off and the feeding apparatus is started and chips are fed into hopper 24. A plug of chips is formed in member 25, which may be facilitated by weighting down check valve 34. As soon as a suitable plug is formed, the steam valve is again opened and the pressure is raised to that corresponding to the temperature to be maintained in the apparatus. Then the conveyer 36 is set in motion. In starting lever 122 is set so as to hold the discs 45 and 46 apart. When chips reach the discs, lever 122 is thrown to press the discs toward each other. The presence of chips between the discs can be determined by sound and feel of lever 122. The speed of the discharge apparatus is adjusted to suit the flow of material as soon as the pulp begins to issue from the apparatus. The tension of spring 83 is now adjusted to the desired quality of the pulp produced.

As above indicated, the material may be fed at such a rate as to take between 20 and 40 seconds from the time it enters the receiver 33 until it is discharged through the valve 93. Obviously the time can be increased but I have found that a good quality of product can be obtained without any greater length of treatment than this in an apparatus constructed and operated as hereinbefore described. It is desirable that the velocity of the material is so great that defibration takes place as soon as the material is raised to the temperature at which the lignin of the middle lamella is markedly softened to avoid unfavorable effects on the material on account of the elevated temperature. It has been common to rely on extended soaking or heating to soften the wood or woody material before the mechanical pulping thereof. Extended treatment in water or steam or both acts to affect the wood in a manner approaching a chemical action. It has not been appreciated that at the temperature which I employ, extended soaking or digestion is not necessary, but that the material can be defibrated with use of little power immediately that it is brought up to temperature. I avoid extended treatment and save the heat necessary to heat a mass of water, save circulating liquid and the apparatus and power required therefor, and shorten the time involved while at the same time obtaining well defibrated and substantially white pulp.

At the same time too high temperatures are avoided in carrying out my invention as I have found that on raising the temperature of the ligno-cellulose material to be treated above temperatures around 400° F. does not in any appreciable way facilitate the defibration thereof and no substantial saving in power required can be accomplished by doing so. On the other hand, it has been found that in raising the temperature above that point a marked discoloration of the pulp is obtained and at still higher temperatures, such as around 480° F., destruction due exothermic reactions rapidly takes place.

Figure 18:
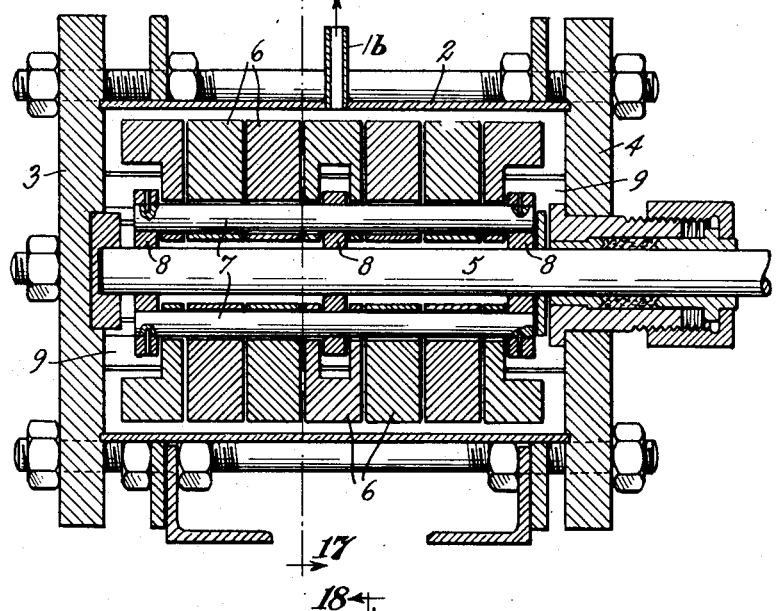
Fig. 18 is a longitudinal sectional view taken on the line 18—18 of Fig. 17.
Figure 17:
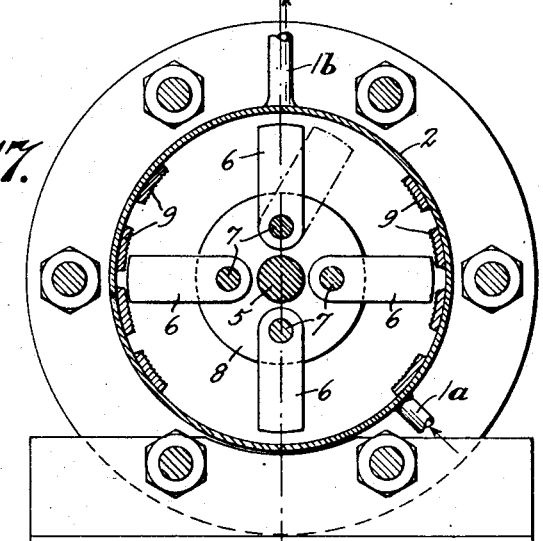
Fig. 17 shows, in vertical transverse section, another apparatus for carrying out the invention and taken on the line 17—17 of Fig. 18.

Figs. 17 and 18 show an apparatus in which I have carried out my process on a small scale. The apparatus shown consists of a cylinder 2 having both its ends 3 and 4 closed in operation. One of the ends may be removed to place wood chips within the vessel. Arranged within the cylinder 2 concentrically with the axis thereof is a member adapted to be rotated from the outside. This member, which resembles the rotating member of a shredder of the hammer-mill type, consists of a main shaft 5 carrying a plurality of movable blades 6 attached to shafts 7 parallel to the main shaft 5 and secured to hubs 8 fixed to said shaft 5. On the inside, the cylindrical vessel 2 is provided with means such as bars 9, or the like, adapted to prevent the enclosed material from following the motion of the rotating members, said material being on rotation thrown against the shell of the vessel and then conveyed against and between the blades 6 so as to ensure an appropriate circulation of the material. The action of the apparatus is similar to that of a dough kneading machine, the defibration being performed essentially through the rubbing or kneading action of the rotating members or blades 6 and through internal friction between the particles of the material caused by the vigorous circulation of the same. Steam is supplied to the cylinder through pipe 1a and a pipe 1b, serves to let out any air or other gases and for reducing steam pressure when the apparatus is stopped. When the material has been steamed for a sufficient time, which may be less than a minute, to bring it to the desired temperature, for example, the same temperature as used in the apparatus shown in Fig. 1, the rotor is started and runs for sufficient time to separate the fibers which time, for example, may be two or three minutes.

It is not absolutely necessary that the blades of the rotating members be movable. In order to obtain still further effective defibration of the material the vessel may be provided with two or more rotating members of the type described.

In this apparatus an end cover is removed to remove the material on finishing the operation but it will be understood that devices may be supplied for continuously feeding and withdrawing the material as in Fig. 1. A flow of water may be used to remove the pulp but it will be understood that it is characteristic of the process that the material is not soaked in water in carrying out the defibration process. The process may be started in one compartment in the presence of small amounts of water, for example, up to 7 pounds of water per pound of dry material after which the defibration may be continued in another compartment in the presence of greater amounts of water but it will be obvious that any great amount of water requires additional power for its movement and free water as such I have found to be unnecessary and undesirable for obtaining the best results and any free water except such as may be necessary to provide a moisture content with the range or limits herein indicated is undesirable. The power required for the defibration of the heated material will be less when the quantity of water present is less. When the quantity of water present does not exceed 7 pounds, for instance, but amounts to 1 to 3 pounds per pound of dry material, the material, after applied defibration, has the appearance of a fairly dry paste.

In Figs. 19 through 22, I have shown still another apparatus for carrying out my invention. Like parts with respect to the embodiments shown in Fig. 1 are given like reference characters. The system as a whole may be the same as in Fig. 1 with the abrading apparatus of this embodiment substituted for that of Fig. 1. The material enters the receiver 33 and is fed by the screw 36 to the inlet 130 of an abrading apparatus analogous to that shown in Figs. 17 and 18. The apparatus includes a cylinder 131 in which is mounted a rotor 132. As shown in Fig. 19, the rotor includes two portions of different character and the left-hand part as seen in Fig. 19 is shown on an enlarged scale in Fig. 22. The part to the right in Fig. 19 is shown on an enlarged scale in Fig. 21. Adjacent the inlet 130 is a screw 144 for feeding the material to the first grinding section shown in Fig. 21. This section includes angle members 133 mounted on the center shaft 134 and having sawed-tooth edges 135. In the periphery of the cylinder is mounted a series of projections of cone like nature 136 formed on removable insets 145 and the projections of the angle members pass between the projections 136, leaving only a small space between them when the teeth of the members 133 are aligned with the projections 136.

Figure 22:
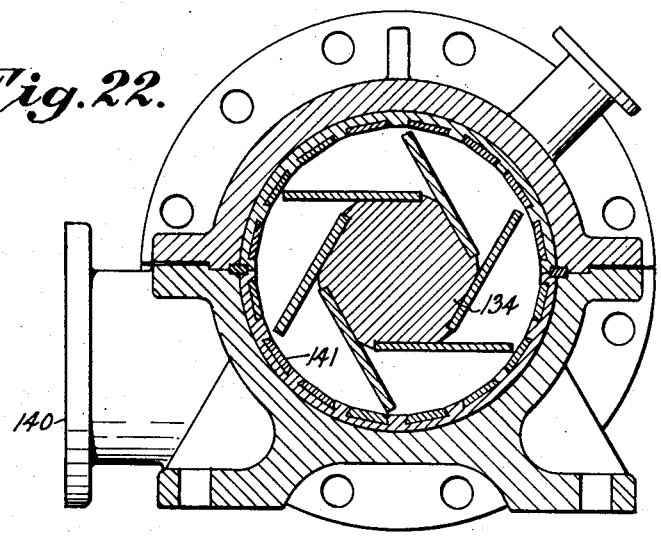
Fig. 22 is a sectional view taken on the line 22—22 of Fig. 19.
Figure 21:
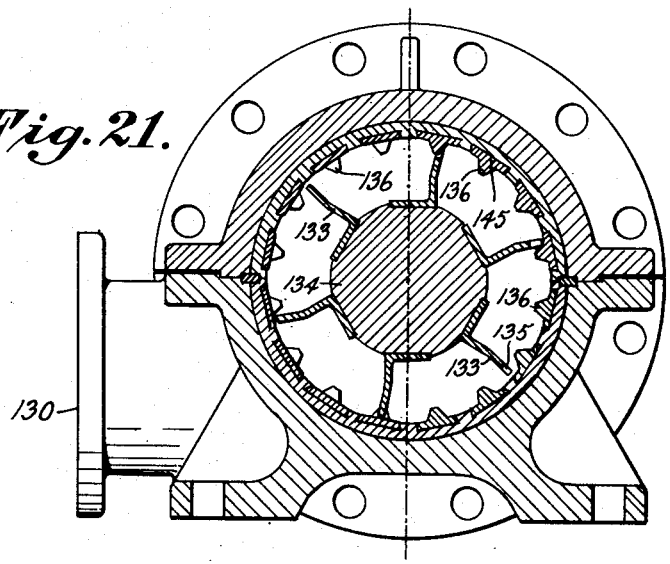
Fig. 21 is a sectional view taken on the line 21—21 of Fig. 19.

In the second section shown in Fig. 22, flat, smooth-edged blades are mounted on the rotor 134 and extend to closely adjacent the periphery. Removable insets 141 in the periphery of the cylinder are provided with intersecting grooves to form rough surfaces. The material advances from right to left, as shown in Fig. 19, and is discharged through the outlet 140 into discharging mechanism similar to that shown in Fig. 1 and related figures. Steam is supplied, as in Fig. 1, through pipes 43 and 44. Pipe 44 is connected to receiver 33 and the discharge end of the apparatus, the latter connection being to prevent uneven or intermittent flow of material through the rotating apparatus which otherwise might be caused by the intermittent action of the discharge apparatus. An apparatus of this type is more gentle in its action on the material than the apparatus of the kind shown in Fig. 1 and therefore it is possible to obtain a fibrous pulp in which the fibers are substantially intact per se while thoroughly separated from each other. This apparatus is not as speedy in operation as that shown in Fig. 1 but is preferably used where a fine quality of pulp is desired with a minimum of mechanical destruction of the fiber walls or where the pulp is to be chemically treated after defibration. The time required for the passing of material in the apparatus shown in Figs. 19 through 22 may be from 2 to 3 minutes. The moisture content in the carrying out of the process by this apparatus should be between 1 to 3 parts of water per pound bone-dry material.

As shown at 143, a reducing valve may be provided in the steam inlet pipe to give a predetermined steam pressure in the apparatus.

In Figs. 23 and 24, I have shown a modification of the structure shown at 25 in Fig. 2. In this arrangement, one wall 151 of the plug chamber 150 is made movable by means of a hand screw 152 about a pivot pin 153. The walls, including the movable wall, are provided with back flow preventing edges 154. If the movable wall 151 is swung outwardly, the resistance to flow is less, and conversely, if the wall 151 is moved inwardly, the resistance is greater. This variation of resistance is desirable for different materials to be treated.

The pulp produced according to this invention is of a very uniform character, virtually free from slivers and large fiber bundles. This is especially the case when the previously described abrading apparatus of the disc-refining type is used.

For the production of wall board, insulation board and similar products, as well as certain grades of cardboard, it is therefore possible to dispense with the screening of the pulp before it is formed into the finished product.

While I have described specific apparatus for carrying out my invention, it will be understood that the process may be carried out in a variety of different kinds of apparatuses and furthermore it will be understood that the process is not to be limited to any particular apparatus. Furthermore, it will be understood that variations may be made in structure and process, and process steps may be added to those described and that other variations may be made within the spirit and scope of the invention.

While steam is the preferred fluid forming the environment in which the heating and defibration takes place, it will be obvious that other gaseous environments may be used. While certain gases may be present, I have obtained good results in a pure steam atmosphere, chemically inert to the material.

What I claim is:

1. In apparatus for producing pulp, members forming a path of flow for material to be treated, means to supply steam to said members, said members being constructed to maintain pressure of steam in said path of flow well above atmospheric pressure, means to feed the material into said path of flow, means to remove the material from said path of flow, rotatable abrading means in said path of flow for defibrating the material under pressure and in the presence of steam, and means to remove moisture from the material fed into said members.

2. In apparatus for producing pulp, members forming a path of flow for material to be treated, means to supply steam to said members, said members being constructed to maintain pressure of steam in said path of flow well above atmospheric pressure, means to feed the material into said path of flow, means to remove the material from said path of flow, rotatable abrading means in said path of flow for defibrating the material under pressure and in the presence of steam, means to remove moisture from the material fed into said members, and means to equalize steam pressure in said path of flow.

3. In apparatus for producing pulp, members forming a path of flow for material to be treated, means to supply steam to said members, said members being constructed to maintain pressure of steam in said path of flow well above atmospheric pressure, means to feed the material into said path of flow, means to remove the material from said path of flow, rotatable abrading means in said path of flow for defibrating the material under pressure and in the presence of steam, means to remove moisture from the material fed into said members, means to regulate the pressure of steam in said path of flow, and means to independently control the rate of feed and rate of removal of said material.

4. In apparatus for producing pulp, members forming a path of flow for material to be treated, means to supply steam to said members, said members being constructed to maintain pressure of steam in said path of flow well above atmospheric pressure, means including a reciprocating plunger for feeding the material into said path of flow, means including series arranged alternately opened valves for removing the material from said path of flow, rotatable abrading means in said path of flow for defibrating the material under pressure and in the presence of steam, means to remove moisture from the material fed into said members, variable speed means for controlling the action of said plunger, and variable speed means for controlling the rate of opening of said valves.

5. In apparatus for producing pulp, members forming a path of flow for material to be treated, means to supply steam to said members, said members being constructed to maintain pressure of steam in said path of flow well above atmospheric pressure, means including a reciprocating plunger for feeding the material into said path of flow, means including intermittently actuated valves for removing the material from said path of flow, and rotatable abrading means in said path of flow for defibrating the material under pressure and in the presence of steam.

6. In apparatus for producing pulp, members forming a path of flow for material to be treated, means to supply steam to said members, said members being constructed to maintain pressure of steam in said path of flow well above atmospheric pressure, means including a loose fitting reciprocating plunger for feeding the material into said path of flow, means to remove the material from said path of flow, and rotatable abrading means in said path of flow for defibrating the material under pressure and in the presence of steam.

7. In apparatus for producing pulp, members forming a path of flow for material to be treated, means to supply steam to said members, said members being constructed to maintain pressure of steam in said path of flow well above atmospheric pressure, reciprocating means to feed the material into said path of flow, reciprocating means to remove the material from said path of flow, rotatable abrading means in said path of flow for defibrating the material under pressure and in the presence of steam, and means to vary the speed of said feeding means and said removing means.

8. In apparatus for manufacturing pulp, a grinder having a pressure housing, a material receiver connected to said grinder, means to feed material to said receiver, means to discharge material from said grinder, and means to supply steam at substantially the same pressure to said receiver and to the discharge side of said grinder.

9. In apparatus for producing pulp, members forming a path of flow for material to be treated, said members being constructed to maintain pressure of steam in said path of flow well above atmospheric pressure, means to feed the material into said path of flow, means to remove the material from said path of flow, rotatable abrading means in said path of flow for defibrating the material under pressure and in the presence of steam, and means to supply steam at substantially the same pressure to the supply and discharge side of said abrading means.

10. The combination with a housing, abrading apparatus within said housing and means to maintain pressure above atmospheric in said housing, of discharge apparatus including a conduit connected to said housing, valves arranged in series in said conduit, means to automatically alternately open and close said valves, and manual means to open said valves independently of the opening by said automatic means.

11. The combination with a housing, abrading apparatus within said housing and means to maintain pressure above atmospheric within said housing, of discharge apparatus including a conduit connected to said housing, a plurality of valves for controlling flow through said conduit, each of said valves having a substantially flat seating surface having a narrow edge for contacting said seating surface, said edge being so narrow as to squeeze material between it and said seating surface to form a steam flow resisting packing and cushioning, and means to quickly alternately open and close said valves.

12. In apparatus of the character set forth, a housing, grinding apparatus within said housing including a plurality of discs, means to maintain pressure above atmospheric in said housing, flexible means to press one of said discs toward the other, and means to render said flexible means ineffective.

13. In apparatus of the character set forth, a housing, grinding apparatus within said housing including a plurality of discs, means to maintain pressure above atmospheric in said housing, a stuffing box in said housing, a shaft secured to one of said discs passing through said stuffing box, and cooling means for said stuffing box.

14. In apparatus of the character set forth, a housing, grinding apparatus within said housing including a plurality of discs, means to maintain pressure above atmospheric in said housing, a stuffing box in said housing, a shaft secured to one of said discs passing through said stuffing box, means to reciprocate said shaft in said stuffing box and liquid cooling means for said stuffing box.

15. In apparatus for producing pulp, conduit means forming a path of flow for fibrous material to be treated, the length and cross-sectional area of said path being proportioned for the conveyance therethrough of said material in a state of dryness such that substantially all water present is absorbed in said material, means to supply steam to said conduit, said conduit means being formed with an inlet at one end and an outlet at the other end and being otherwise closed, rotatable abrading means within said conduit means in said path of flow for defibrating the material under pressure and in the presence of steam, conveying means including a member in said conduit means and formed with a surface extending transversely to the lengthwise direction of said path, and means for imparting movement to said member in a direction causing said transversely positioned surface to exert force on the material in a direction having at least a component extending in the lengthwise direction of said path so that said surface directly engages said dry material and propels said material into and through said path, including said abrading means, and means to remove the material from said path of flow, said last mentioned means being constructed and arranged to maintain pressure of steam in said path of flow well above atmospheric pressure.

16. In apparatus for producing pulp, conduit means forming a path of flow for fibrous material to be treated, the length and cross sectional area of said path being proportioned for the conveyance therethrough of said material in a state of dryness such that substantially all water present is absorbed in said material, means to supply steam to said conduit, said conduit means being formed with an inlet at one end and an outlet at the other end and being otherwise closed, rotatable abrading means within said conduit means in said path of flow for defibrating the material under pressure and in the presence of steam, feeding means including a member in said conduit means adjacent to said inlet and formed with a surface extending transversely to the lengthwise direction of said path, and means for imparting movement to said member in a direction causing said transversely positioned surface to exert force on the material in a direction having at least a component extending in the lengthwise direction of said path so that said surface directly engages said dry material and propels said material into and through said path, a screw conveyer within said path of flow between said feeding means and said abrading means for conveying the dry material through said path to said abrading means, and means to remove the material through said outlet from said path of flow, said last mentioned means being constructed and arranged to maintain pressure of steam in said path of flow well above atmospheric pressure.

ARNE JOHAN ARTHUR ASPLUND.